(12) United States Patent
Yang et al.

(10) Patent No.: US 12,534,121 B2
(45) Date of Patent: Jan. 27, 2026

(54) STEERING DEVICE OF VEHICLE

(71) Applicant: HL MANDO CORPORATION, Gyeonggi-do (KR)

(72) Inventors: Jun hyuk Yang, Gyeonggi-do (KR); Hyun bi Kwon, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/892,275

(22) Filed: Sep. 20, 2024

(65) Prior Publication Data
US 2025/0346282 A1 Nov. 13, 2025

(30) Foreign Application Priority Data
May 7, 2024 (KR) .................. 10-2024-0060103

(51) Int. Cl.
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC ........... B62D 1/184; B62D 1/187; B62D 1/19
See application file for complete search history.

(56) References Cited

U.S. PATENT DOCUMENTS

| | | | | | |
|---|---|---|---|---|---|
| 5,117,707 A | * | 6/1992 | Kinoshita | ............. | B62D 1/184 280/775 |
| 5,213,004 A | * | 5/1993 | Hoblingre | ............. | B62D 1/184 74/528 |
| 5,570,610 A | * | 11/1996 | Cymbal | ................. | B62D 1/184 74/531 |
| 5,722,299 A | * | 3/1998 | Yamamoto | ............. | B62D 1/184 280/775 |
| 5,893,676 A | * | 4/1999 | Yamamoto | ............. | B62D 1/184 403/321 |
| 6,467,807 B2 | * | 10/2002 | Ikeda | .................... | B62D 1/184 280/775 |
| 7,010,996 B2 | * | 3/2006 | Schick | .................. | B62D 1/184 280/775 |

(Continued)

FOREIGN PATENT DOCUMENTS

| KR | 10-1622125 | 5/2016 |
|---|---|---|
| KR | 10-2017-0019743 | 2/2017 |
| KR | 10-2018-0070244 | 6/2018 |

*Primary Examiner* — Laura Freedman
(74) *Attorney, Agent, or Firm* — WOMBLE BOND DICKINSON (US) LLP

(57) ABSTRACT

According to the present embodiments, it is possible to provide a vehicle steering device including a lower column receiving an upper column and having a pair of distance brackets, an adjust bolt coupled to pass through the distance brackets, a fixed cam penetrated by the adjust bolt and slidably coupled to a plate bracket, a sleeve coupled to an outer circumferential surface of the adjust bolt and including includes a plurality of protrusions protruding radially from an outer surface thereof, and a lever assembly including a movable cam coupled to an outer circumferential surface of the sleeve and engaged with the fixed cam and a lever coupled to an outer circumferential surface of the sleeve, thereby reducing impact to the driver and preventing an abnormal operation of the airbag during vehicle collision.

7 Claims, 10 Drawing Sheets

(56) References Cited

U.S. PATENT DOCUMENTS

| | | | | |
|---|---|---|---|---|
| 7,267,025 | B2 * | 9/2007 | Ko | B62D 1/184 |
| | | | | 74/493 |
| 7,717,011 | B2 * | 5/2010 | Hirooka | B62D 1/184 |
| | | | | 74/493 |
| 8,590,932 | B2 * | 11/2013 | Dietz | B62D 1/184 |
| | | | | 280/775 |
| 9,079,612 | B2 * | 7/2015 | Wilkes | B62D 1/187 |
| 9,428,214 | B2 * | 8/2016 | Ku | B62D 1/184 |
| 11,186,307 | B2 * | 11/2021 | Bodtker | B62D 1/184 |
| 11,352,047 | B2 * | 6/2022 | Thebault | B62D 1/184 |
| 11,999,406 | B2 * | 6/2024 | Heo | B62D 1/185 |
| 2019/0161107 | A1 * | 5/2019 | Kwon | B62D 1/187 |

* cited by examiner

STEERING DEVICE OF VEHICLE

CROSS-REFERENCE TO RELATED APPLICATION

This application claims priority from Korean Patent Application No. 10-2024-0060103, filed on May 7, 2024, which is hereby incorporated by reference for all purposes as if fully set forth herein.

BACKGROUND

Field

The present embodiments relate to a vehicle steering device and, more specifically, to a vehicle steering device capable of reducing impact to the driver and preventing an abnormal operation of the airbag during vehicle collision.

Description of Related Art

In general, a vehicle steering column is a device that is formed to surround the steering shaft which transfers the rotation force generated when the driver manipulates the steering wheel to the rack-pinion mechanism and is coupled to the vehicle body through a bracket while supporting rotation of the steering shaft to fix the position of the steering shaft.

Further, the steering column may have a telescope function and/or tilt function for adjusting the position of the steering wheel to allow the user to easily manipulate the steering wheel. In a so-called manual-type steering column in which the user manually locks or unlocks the telescope function and the tilt function, a lever protrudes from a lower end of the steering column.

However, when the vehicle collides, the driver may be injured as the driver's knee hits the lever protruding the lower side of the steering column or a sharp surface of the lever broken by the impact. If the vehicle comes equipped with a knee airbag, the airbag may lose its functionality by being torn by the broken lever.

BRIEF SUMMARY

Conceived in the foregoing background, the present embodiments relate to a vehicle steering device capable of reducing impact to the driver and preventing an abnormal operation of the airbag during vehicle collision.

According to the present embodiments, there may be provided a vehicle steering device, comprising a lower column receiving an upper column and having a pair of distance brackets, an adjust bolt coupled to pass through the distance brackets, a fixed cam penetrated by the adjust bolt and slidably coupled to a plate bracket, a sleeve coupled to an outer circumferential surface of the adjust bolt, and a lever assembly including a movable cam coupled to an outer circumferential surface of the sleeve and engaged with the fixed cam and a lever coupled to an outer circumferential surface of the sleeve.

According to the present embodiments, there may be provided a vehicle steering device, comprising a lower column receiving an upper column and having a pair of distance brackets, an adjust bolt coupled to pass through the distance brackets, a fixed cam penetrated by the adjust bolt and slidably coupled to a plate bracket, and a lever assembly including a movable cam coupled to the adjust bolt and engaged with the fixed cam and a lever coupled to the movable cam, and having a pin formed in any one of the movable cam and the lever to protrude toward the other and a recess formed in the other to allow the pin to be inserted thereto.

According to the present embodiments, there may be provided a vehicle steering device, comprising a lower column receiving an upper column and having a pair of distance brackets, an adjust bolt coupled to pass through the distance brackets, a fixed cam penetrated by the adjust bolt and slidably coupled to a plate bracket, and a lever assembly including a movable cam coupled to the adjust bolt and engaged with the fixed cam and a lever coupled to the movable cam, and having a hemispherical protrusion formed in any one of the movable cam and the lever to protrude toward the other and a depression formed in the other to allow the protrusion to be inserted thereto.

According to the present embodiments, it is possible to reduce impact to the driver and prevent an abnormal operation of the airbag during vehicle collision.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
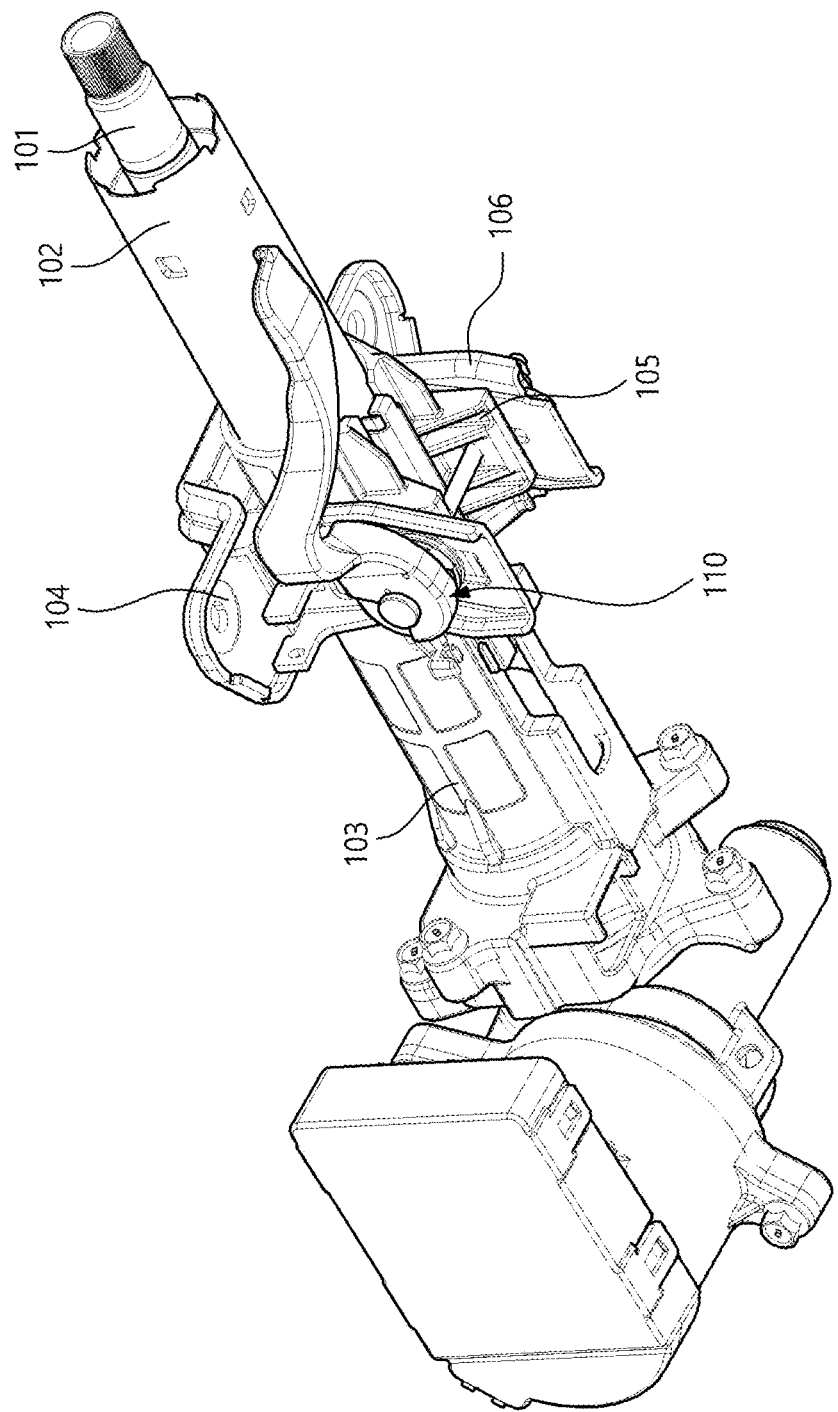
FIG. 1 is a perspective view illustrating a steering device of a vehicle according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
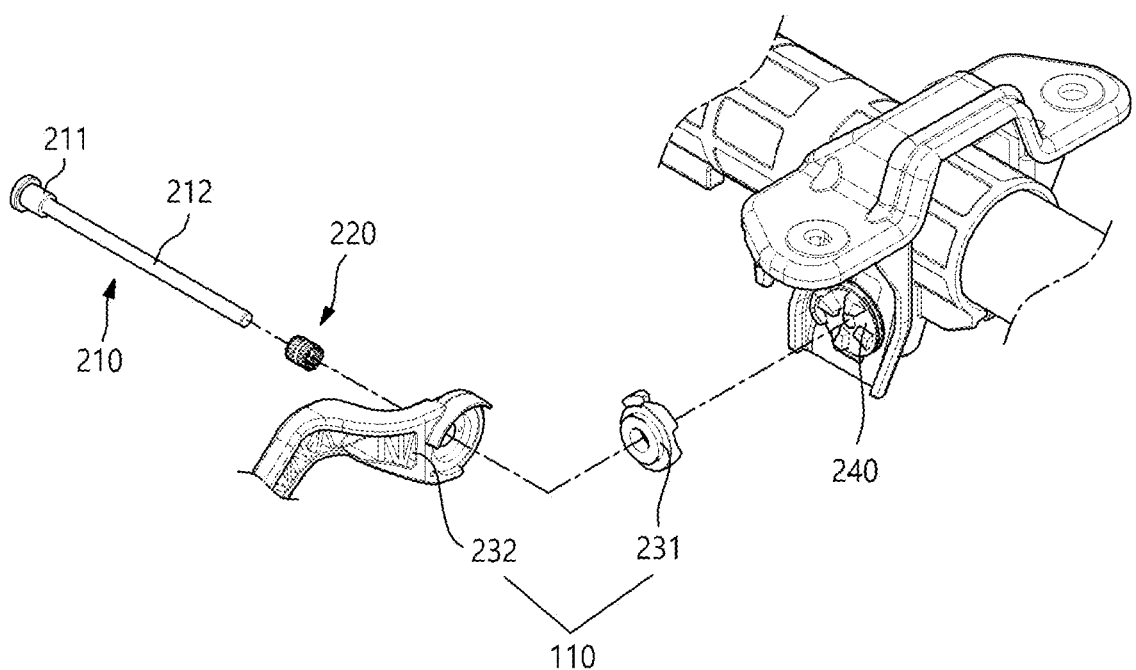
FIG. 2 is an exploded perspective view illustrating a portion of a steering device of a vehicle according to the present embodiments.
Figure 3:
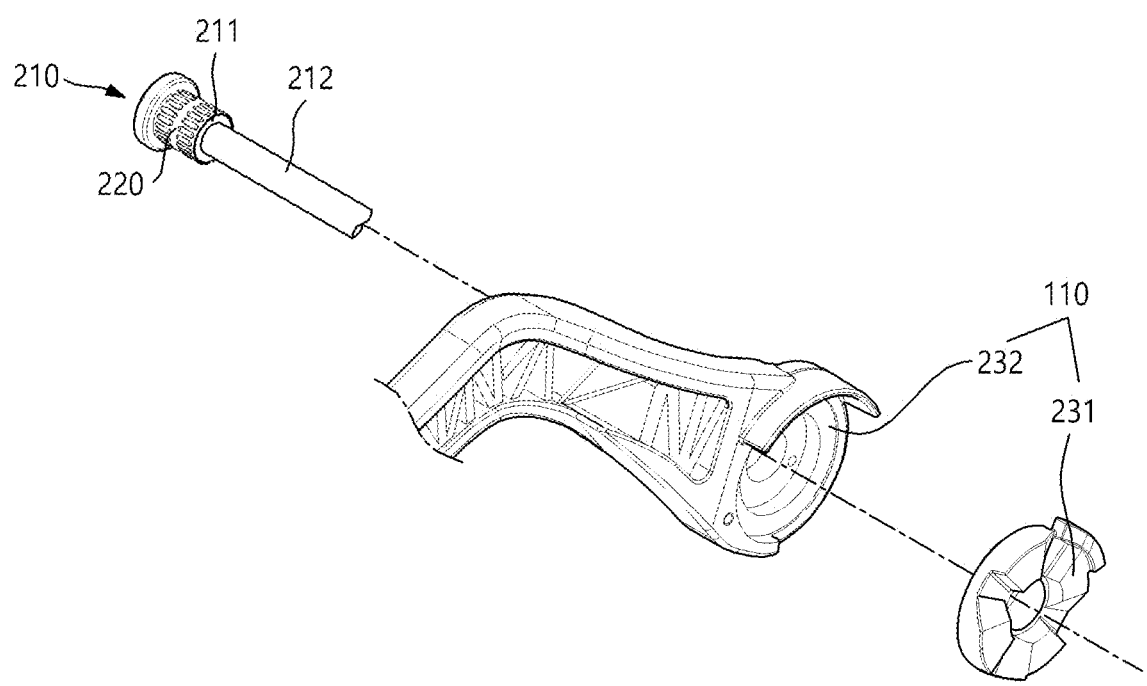
FIG. 3 is an exploded perspective view illustrating a portion of a steering device of a vehicle according to the present embodiments.
Figure 4:
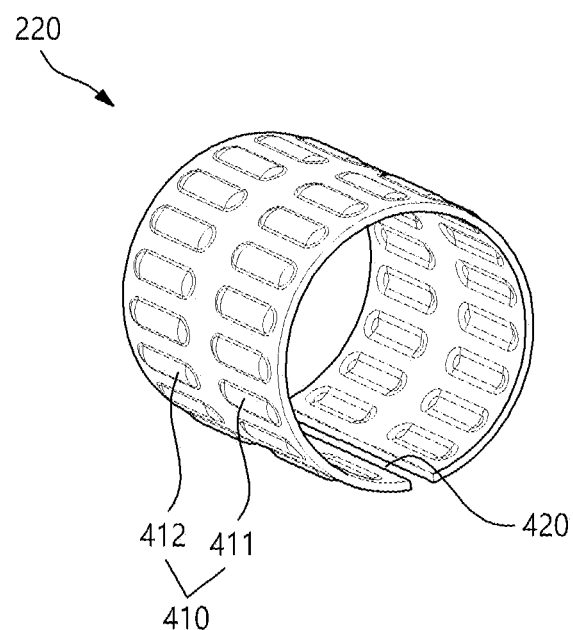
FIG. 4 is a perspective view illustrating a portion of a steering device of a vehicle according to the present embodiments.
Figure 5:
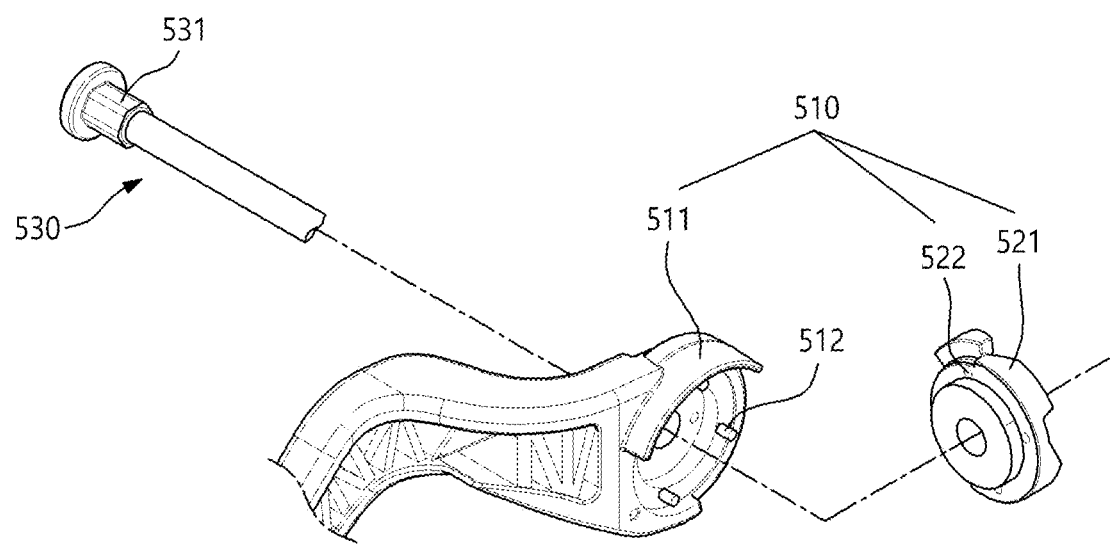
FIG. 5 is an exploded perspective view illustrating a portion of a steering device of a vehicle according to the present embodiments.
Figure 6:
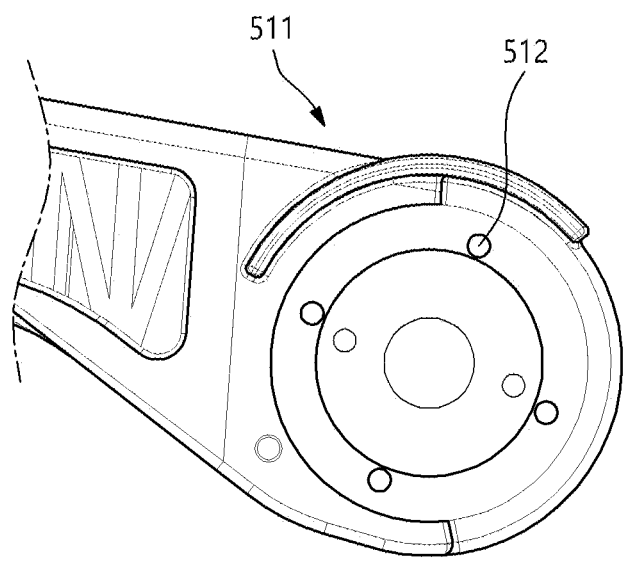
FIG. 6 is a side view illustrating a portion of a steering device of a vehicle according to the present embodiments.
Figure 7:
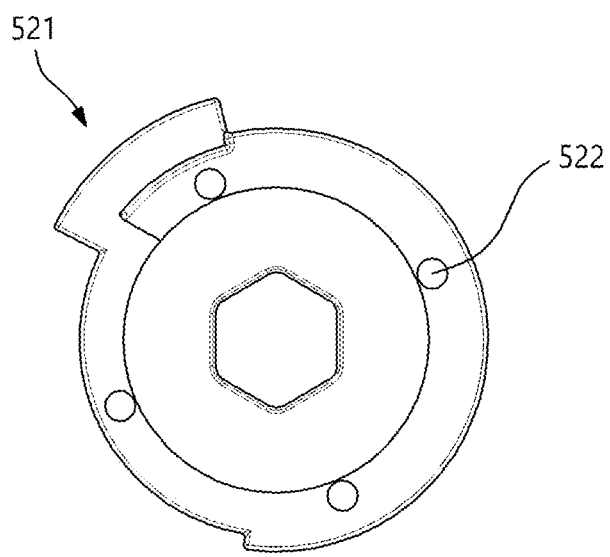
FIG. 7 is a side view illustrating a portion of a steering device of a vehicle according to the present embodiments.
Figure 8:
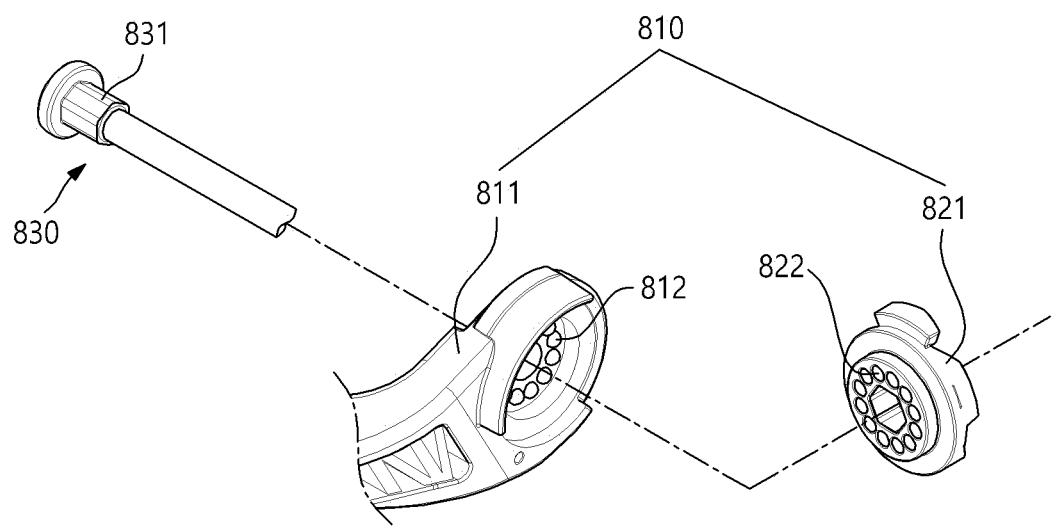
FIG. 8 is an exploded perspective view illustrating a portion of a steering device of a vehicle according to the present embodiments.
Figure 9:
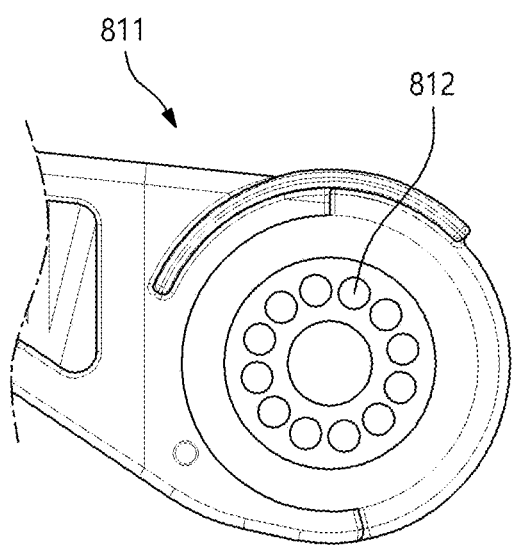
FIG. 9 is a side view illustrating a portion of a steering device of a vehicle according to the present embodiments.
Figure 10:
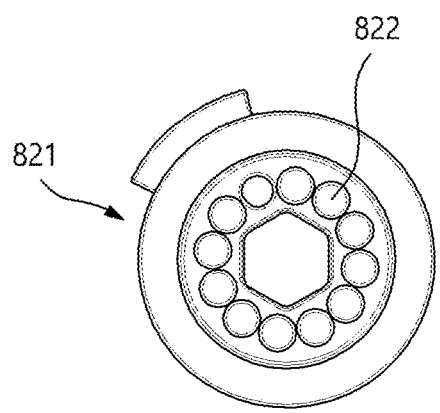
FIG. 10 is a side view illustrating a portion of a steering device of a vehicle according to the present embodiments.

FIG. 1 is a perspective view illustrating a steering device of a vehicle according to the present embodiments. FIG. 2 is an exploded perspective view illustrating a portion of a steering device of a vehicle according to the present embodiments. FIG. 3 is an exploded perspective view illustrating a portion of a steering device of a vehicle according to the present embodiments. FIG. 4 is a perspective view illustrating a portion of a steering device of a vehicle according to the present embodiments. FIG. 5 is an exploded perspective view illustrating a portion of a steering device of a vehicle according to the present embodiments. FIG. 6 is a side view illustrating a portion of a steering device of a vehicle according to the present embodiments. FIG. 7 is a side view illustrating a portion of a steering device of a vehicle according to the present embodiments. FIG. 8 is an exploded perspective view illustrating a portion of a steering device of a vehicle according to the present embodiments. FIG. 9 is a side view illustrating a portion of a steering device of a vehicle according to the present embodiments. FIG. 10 is a side view illustrating a portion of a steering device of a vehicle according to the present embodiments.

A description is made below with reference to FIGS. 1 and 4.

According to the present embodiments, there may be provided a vehicle steering device, comprising a lower column 103 receiving an upper column 102 and having a pair of distance brackets 105, an adjust bolt 210 coupled to pass through the distance brackets 105, a fixed cam 240 penetrated by the adjust bolt 210 and slidably coupled to a plate bracket 106, a sleeve 220 coupled to an outer circumferential surface of the adjust bolt 210, and a lever assembly 110 including a movable cam 231 coupled to an outer circumferential surface of the sleeve 220 and engaged with the fixed cam 240 and a lever 232 coupled to an outer circumferential surface of the sleeve 220.

A steering device of the vehicle according to the present embodiments includes a lower column 103, an adjust bolt 210, a sleeve 220, and a lever assembly 110. The upper column 102 receiving the steering shaft 101 is received in the lower column 103. The lower column 103 is coupled to the vehicle body by the mounting bracket 104, and a pair of distance brackets 105 are provided on the outer surface of the lower column 103, and the plate bracket 106 of the mounting bracket 104 is provided to be supported on the outer surface of the distance bracket. The adjust bolt 210 is coupled to pass through the plate bracket 106 and the distance bracket 105, and the fixing cam 240 is coupled to be penetrated by the adjust bolt 210 and to be fixed to the plate bracket 106 in the direction in which the adjust bolt 210 rotates, and is coupled to the plate bracket 106 to be slidable upward and downward.

The lever assembly 110 includes a movable cam 231 and a lever 232, and the movable cam 231 is provided to be penetrated by the adjust bolt 210 and engaged with the fixed cam 240. As the driver manipulates the lever 232, the telescope operation and the tilt operation of the steering column are locked or unlocked by the pressing force generated when the distance between the movable cam 231 and the fixed cam 240 increases or decreases. The locking or unlocking operation structure according to the lever manipulation is the same as that generally known, and thus a detailed description thereof is omitted.

The lever manipulated by the driver to lock or unlock the telescope operation and the tilt operation is provided to protrude from the lower side of the steering column toward the driver (see FIG. 1). If a collision occurs in the vehicle in this structure, there is a risk that the lower body of the driver, especially the knee portion, may collide with the lever. If colliding with the steering wheel, the driver's upper body may be protected by the collapsing function of the steering column but, if colliding with the lever, the driver's lower body may not be protected under the conventional steering column structure. In other words, in the conventional steering column structure, after the lever is rotated downward from the locked state to the unlocked state, the movable cam is stopped by the fixed cam to stop further rotation. Therefore, a large impact may be applied to the lower body (especially the knee portion) of the driver and, if the lever is damaged by the collision, an injury may occur due to a sharp cross section. Further, in the case of a vehicle equipped with a knee airbag, the deploying airbag may be torn by a sharp cross section of the damaged lever, losing its functionality.

However, in the vehicle steering device according to the present embodiments, the lever 232 of the lever assembly 110 may be provided to be further rotated beyond the locking manipulation range, thereby preventing the driver from injury and the knee airbag from losing its functionality in the event of a vehicle collision.

In the vehicle steering device according to the present embodiments, the lever assembly 110 is coupled to the adjust bolt 210 with the sleeve 220 interposed therebetween. The sleeve 220 generates a frictional force between the lever assembly 110 and the adjust bolt 210. Accordingly, if the driver manipulates the lever 232, the movable cam 231 is rotated by the frictional force caused by the sleeve 220, and if the movable cam 231 is rotated, the telescope operation and the tilt operation are locked or unlocked. The sleeve 220 may be formed of a plastic material and may be injection-molded.

The conventional steering column is a structure that is directly supported in the circumferential direction (e.g., a block-groove engagement structure) so that the lever and the movable cam rotate together and is coupled to the adjust bolt. Therefore, if the lever rotates downward to stop the movable cam by the fixed cam, the lever may no longer rotate. However, in the vehicle steering device according to the present embodiments, the lever 232 and the movable cam 231 are not directly supported in the circumferential direction, and the driver's lever manipulation is transferred to the movable cam 231 through the frictional force of the sleeve 220. In other words, the lever manipulation torque of the driver is transferred in the order of the lever 232, the sleeve 220, the adjust bolt 210, the sleeve 220, and the movable cam 231. In this structure, if the driver's lower body collides with the lever 232, even if the movable cam 231 is stopped by the fixed cam 240, the lever 232 may be further rotated beyond the operating limit. In other words, during the driver's normal lever manipulation, the lever 232 is rotated together with the movable cam 231 by the frictional force of the sleeve 220, but if a large impact occurs, such as collision, the lever 232 is further rotated beyond the movable cam 231, thereby preventing the driver from being injured and the knee airbag from losing its functionality. Further, the impact applied to the driver's lower body while colliding with the lever 232 may be absorbed and reduced by the frictional force of the sleeve 220.

According to an embodiment, the adjust bolt 210 may include a large-diameter portion 211 to which the sleeve 220 is coupled and a small-diameter portion 212 penetratingly coupled to the distance bracket 105. The large-diameter portion 211 is provided at one end of the adjust bolt 210 and is a portion in which the lever 232 and the movable cam 231 are coupled through the sleeve 220. The large-diameter portion 211 has an outer surface having a positioning device curvature so that the movable cam 231 is rotatable only by the frictional force provided by the sleeve 220 when the driver manipulates the lever and, upon collision, the lever 232 is rotatable beyond the operating range. In other words, the outer surface of the large-diameter portion 211 has a shape that is not supported in the circumferential direction by the movable cam 231 and the lever 232.

According to an embodiment, the movable cam 231 and the lever 232 may be coupled to the outer surface of the sleeve 220 in a press-fit manner. More specifically, the movable cam 231 and the lever 232 may be press-fitted to the outer surface of the sleeve 220 coupled to the large-diameter portion 211. The movable cam 231 and the lever 232 are coupled to each other while pressing the sleeve 220 hard, and thus the lever manipulation of the driver may be smoothly performed without slipping.

According to an embodiment, the sleeve 220 may include a plurality of protrusions 410 protruding radially from the outer surface. Coupling holes into which the adjust bolt 210 and the sleeve 220 are inserted are formed in the movable cam 231 and the lever 232, and the plurality of protrusions 410 are supported on the inner surfaces of the coupling holes between the movable cam 231 and the lever 232. Accordingly, the frictional force provided by the sleeve 220 is further increased, and a sense of heterogeneity does not occur when the driver manipulates the lever.

According to an embodiment, the plurality of protrusions 410 may include a first protrusion 411 supported on the inner surface of the movable cam 231 and a second protrusion 412 supported on the inner surface of the lever 232. In other words, the first protrusion 411 may enhance the frictional force between the movable cam 231 and the adjust bolt 210, and the second protrusion 412 may enhance the frictional force between the lever 232 and the adjust bolt 210.

According to an embodiment, a plurality of first protrusions 411 may be provided while being spaced apart in the circumferential direction. According to an embodiment, a plurality of second protrusions 412 may be provided while being spaced apart in the circumferential direction. In other words, the protrusions 410 of the sleeve 220 may be provided in a plurality of rows, and the first protrusions 411 and the second protrusions 412 may be disposed along the circumferential direction at equal intervals.

According to an embodiment, the sleeve 220 may include a cutoff 420 that is formed in the longitudinal direction from one end to the other by being cut through the inner surface and the outer surface. The cutout 420 may enhance the assembling property of the sleeve 220 and the adjust bolt 210. In other words, the adjust bolt 210 may be inserted into the sleeve 220 in a state in which the cutout 420 is opened, and be contracted by its own elastic force, and the sleeve 220 may be tightly coupled to the large-diameter portion 211. Further, a free space may be formed between the lever 232, the movable cam 231, and the large-diameter portion 211 by an interval of the cutout 420, so that the lever 232 and the movable cam 231 may be more smoothly coupled to the outer surface of the sleeve 220 in a press-fit manner.

Further, in the lever assembly, either the movable cam or the lever may have a pin protruding toward the other, and the other may have a recess to which the pin is inserted.

Here, a plurality of pins may be disposed along the circumferential direction, and a plurality of recesses may be disposed along the circumferential direction to correspond to the arrangement of the pins.

Therefore, if a large impact occurs as in the case of a vehicle collision, the impact applied to the driver's lower body while colliding with the lever is absorbed by the frictional force of the sleeve, and the pin is broken so that the lever rotates freely about the movable cam and the adjust bolt, thereby preventing the driver from being injured and the knee airbag from losing its functionality.

Alternatively, in the lever assembly, either the movable cam or the lever may have a hemispherical protrusion protruding toward the other, and the other may have a depression to which the protrusion is inserted.

Here, a plurality of protrusions may be disposed along the circumferential direction, and a plurality of depressions may be disposed along the circumferential direction to correspond to the arrangement of the protrusions.

Therefore, if a large impact occurs as in the case of a vehicle collision, the impact applied to the driver's lower body while colliding with the lever is absorbed by the frictional force of the sleeve while the protrusion escapes off the depression, and the process of being inserted to the next depression is repeated so that the lever rotates freely about the movable cam and the adjust bolt, thereby preventing the driver from being injured and the knee airbag from losing its functionality.

Next, another embodiment is described with reference to FIGS. 5 to 7. No detailed description is given of the same matters as those in the above-described embodiments.

According to the present embodiments, there may be provided a vehicle steering device, comprising a lower column 103 receiving an upper column 102 and having a pair of distance brackets 105, an adjust bolt 530 coupled to pass through the distance brackets 105, a fixed cam 240 penetrated by the adjust bolt 530 and slidably coupled to a plate bracket 106, and a lever assembly 510 including a movable cam 521 coupled to the adjust bolt 530 and engaged with the fixed cam 240 and a lever 511 coupled to the movable cam 521, and having a pin 512 formed in any one of the movable cam 521 and the lever 511 to protrude toward the other and a recess 522 formed in the other to allow the pin 512 to be inserted thereto.

A lever assembly 510 includes a movable cam 521 and a lever 511, and the movable cam 521 and the lever 511 are coupled to each other by a pin 512 and a recess 522. In a normal situation, when the driver manipulates the lever 511, the lever 511 and the movable cam 521 are rotated together by the pin 512 and the recess 522. However, if the lower body (especially the knee portion) of the driver hits the lever 511 and the movable cam 521 is stopped by the fixed cam 240 during a vehicle collision, the pin 512 is broken, the lever 511 and the movable cam 521 are decoupled from each other, and the lever 511 is further rotated beyond the operating range. Therefore, it is possible to prevent injury to the driver and loss of function of the knee airbag. Further, the impact applied to the driver's lower body while colliding with the lever 511 may be reduced by being absorbed by the fracture of the pin 512.

More specifically, according to an embodiment, a plurality of pins 512 may be disposed on a surface of the lever 511 facing the movable cam 521 in the circumferential direction. A plurality of recesses 522 may be disposed along the circumferential direction on a surface of the movable cam 521 facing the lever 511 to correspond to the arrangement of the fins 512. The drawings illustrate an embodiment in which four pins 512 and four recesses 522 are disposed at equal intervals so as to be spaced apart from each other at regular intervals along the circumferential direction around a hole through which the adjust bolt 530 passes, but the number and arrangement of the pins 512 and the recesses 522 may be appropriately changed considering a shear force required for breaking the pin 512. Further, although an embodiment in which the pin 512 is formed in the lever 511 and the recess 522 is formed in the movable cam 521 is illustrated in the drawings, it is natural that the recess 522 is formed in the lever 511 and the pin 512 is formed in the movable cam 521. The pin 512 and the recess 522 together may be formed in each of the lever 511 and the pin 512.

According to an embodiment, the adjust bolt 530 may include a coupling portion 531 that is coupled to fix the movable cam 521 in the circumferential direction. The coupling portion 531 may be formed at one end of the adjust bolt 530 in a polygonal shape, and the movable cam 521 has a coupling hole that has a shape corresponding to the coupling portion 531 to be engaged.

According to an embodiment, the lever 511 may not be supported by the adjust bolt 530 in the circumferential direction. The lever 511 has a coupling hole to which the adjust bolt 530 is inserted, and the coupling hole of the lever 511 is formed to have a larger radius than that of the adjust bolt 530 not to be supported in the circumferential direction. Accordingly, if the pin 512 is broken, the lever 511 may freely rotate about the movable cam 521 and the adjust bolt 530, thereby preventing an injury to the driver and loss of function of the knee airbag.

Next, another embodiment is described with reference to FIGS. 8 to 10. No detailed description is given of the same matters as those in the above-described embodiments.

According to the present embodiments, there may be provided a vehicle steering device, comprising a lower column 103 receiving an upper column 102 and having a pair of distance brackets 105, an adjust bolt 830 coupled to pass through the distance brackets 105, a fixed cam 240 penetrated by the adjust bolt 830 and slidably coupled to a plate bracket 106, and a lever assembly 810 including a movable cam 821 coupled to the adjust bolt 830 and engaged with the fixed cam 240 and a lever 811 coupled to the movable cam 821, and having a hemispherical protrusion 812 formed in any one of the movable cam 821 and the lever 811 to protrude toward the other and a depression 822 formed in the other to allow the protrusion 812 to be inserted thereto.

A lever assembly 810 includes a movable cam 821 and a lever 811, and the movable cam 821 and the lever 811 are coupled by a protrusion 812 and a depression 822. In a normal situation, when the driver manipulates the lever 811, the lever 811 and the movable cam 821 are rotated together by the protrusion 812 and the depression 822. However, if the lower body (especially the knee portion) of the driver hits the lever 811 and the movable cam 821 is stopped by the fixed cam 240 during a vehicle collision, the hemispherical protrusion 812 escapes off the depression 822 so that the lever 811 is further rotated beyond the operating range. Therefore, it is possible to prevent injury to the driver and loss of function of the knee airbag. Further, if the protrusion 812 escapes off the depression 822, the distance between the lever 811 and the movable cam 821 increases, and thus a strong pressure is formed between the lever 811 and the movable cam 821 and a frictional force is increased. Accordingly, the impact applied to the driver's lower body by colliding with the lever 811 may be reduced by being absorbed by the frictional force with the movable cam 821 caused when the lever 811 rotates.

More specifically, according to an embodiment, a plurality of protrusions 812 may be disposed on a surface of the lever 811 facing the movable cam 821 in the circumferential direction around the hole penetrated by the adjust bolt 830. A plurality of depressions 822 may be disposed, around the hole penetrated by the adjust bolt 830, along the circumferential direction on a surface of the movable cam 821 facing the lever 811 to correspond to the arrangement of the fins 812. Accordingly, the process in which the protrusion 812 escaping off the depression 822 is inserted into the next depress 822 along the rotation direction of the lever 811 is repeated, and the lever 811 is rotated beyond the operating range.

According to an embodiment, the adjust bolt 830 may include a coupling portion 831 that is coupled to fix the movable cam 821 in the circumferential direction. The coupling portion 831 may be formed at one end of the adjust bolt 830 in a polygonal shape, and the movable cam 821 has a coupling hole that has a shape corresponding to the coupling portion 831 to be engaged.

According to an embodiment, the lever 811 may not be supported by the adjust bolt 830 in the circumferential direction. The lever 811 has a coupling hole to which the adjust bolt 830 is inserted, and the coupling hole of the lever 811 is formed to have a larger radius than that of the adjust bolt 830 not to be supported in the circumferential direction. Accordingly, by repeating the process in which the protrusion 812 escapes off the depression 822 and is inserted into the next depression 822, the lever 811 may freely rotate about the movable cam 821 and the adjust bolt 830, thereby preventing an injury to the driver and loss of function of the knee airbag.

By the so-shaped vehicle steering device, it is possible to reduce impact to the driver and prevent an abnormal operation of the airbag during vehicle collision.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A vehicle steering device, comprising:
   a lower column receiving an upper column and having a pair of distance brackets;
   an adjust bolt coupled to pass through the distance brackets;
   a fixed cam penetrated by the adjust bolt and slidably coupled to a plate bracket;
   a sleeve coupled to an outer circumferential surface of the adjust bolt; and
   a lever assembly including a movable cam coupled to an outer surface of the sleeve and engaged with the fixed cam and a lever coupled to the outer surface of the sleeve
   wherein the sleeve includes a plurality of protrusions protruding radially from the outer surface thereof, and the plurality of protrusions include a first protrusion supported on an inner surface of the movable cam and a second protrusion supported on an inner surface of the lever.

2. The vehicle steering device of claim 1, wherein the adjust bolt includes a large-diameter portion to which the sleeve is coupled and a small-diameter portion penetratingly coupled to the pair of distance brackets.

3. The vehicle steering device of claim 2, wherein the large-diameter portion of the adjust bolt has an outer surface having a positioning device curvature so that the outer surface of the large-diameter portion is not supported in a circumferential direction by the movable cam and the lever.

4. The vehicle steering device of claim 1, wherein the movable cam and the lever are coupled to the outer surface of the sleeve in a press-fit manner.

5. The vehicle steering device of claim 1, wherein a plurality of first protrusions are provided to be spaced apart in a circumferential direction.

6. The vehicle steering device of claim 1, wherein a plurality of second protrusions are provided to be spaced apart in a circumferential direction.

7. The vehicle steering device of claim 1, wherein the sleeve includes a cutoff formed in a longitudinal direction from one end to another end by being cut through an inner surface and the outer surface of the sleeve.

* * * * *